United States Patent [19]
Jackman

[11] Patent Number: 5,366,165
[45] Date of Patent: Nov. 22, 1994

[54] SYSTEM AND METHOD FOR RECYCLING OF AUTOMOTIVE OIL FILTERS

[75] Inventor: Raymond P. Jackman, Melbourne, Fla.

[73] Assignee: United Recyclers, Inc., Suffern, N.Y.

[21] Appl. No.: 19,472

[22] Filed: Feb. 18, 1993

Related U.S. Application Data

[63] Continuation-in-part of Ser. No. 838,188, Feb. 18, 1992, abandoned.

[51] Int. Cl.⁵ .................. B02C 19/12; B02C 23/20
[52] U.S. Cl. .......................... 241/24; 241/60; 241/79; 241/79.1; 241/152.1; 241/DIG. 38
[58] Field of Search .......... 241/23, 60, 79, 79.1, 241/99, 24, DIG. 38, 152.1; 209/3

[56] References Cited

U.S. PATENT DOCUMENTS

| | | | |
|---|---|---|---|
| 5,135,176 | 8/1992 | Barber | 241/23 |
| 5,225,137 | 7/1993 | Sadr | 264/349 |
| 5,232,607 | 8/1993 | Lundquist | 210/787 |
| 5,236,136 | 8/1993 | McCarty et al. | 241/24 |
| 5,257,740 | 11/1993 | Prew et al. | 241/21 |

FOREIGN PATENT DOCUMENTS

2146272  4/1985  United Kingdom .
8501893  5/1985  WIPO .

Primary Examiner—Mark Rosenbaum
Assistant Examiner—John M. Husar

[57] ABSTRACT

Used automotive type oil filters are provided in drums to a tipper which operates to deposit the filters therefrom into a feed hopper. An input feed conveyor receives the filters from the hopper and conveys the filters to a coarse shredder. Shredded pieces are deposited from the coarse shredder onto a conveyor which deposits the pieces into a fine shredder from which the shredded pieces exit onto either another conveyor for transport to a hammer mill shredder or to a washer input conveyor for transport into a washing drum. A magnetic separator may be disposed between the hammer mill shredder and washing drum to separate out ferrous materials for transport to the drum. Oil that drips and seeps from the shredders, hopper and conveyors is collected in wells and conducted therefrom through filters and under pump action to a waste oil storage tank. The washing drum rotates at an angle to the horizontal and includes an auger on its inside face to conduct the shredded pieces through and out of the drum as well as screens at each end of the drum. Heated and pressurized water is sprayed onto the so conveyed shredded pieces separating oil, paper and metal.

40 Claims, 6 Drawing Sheets

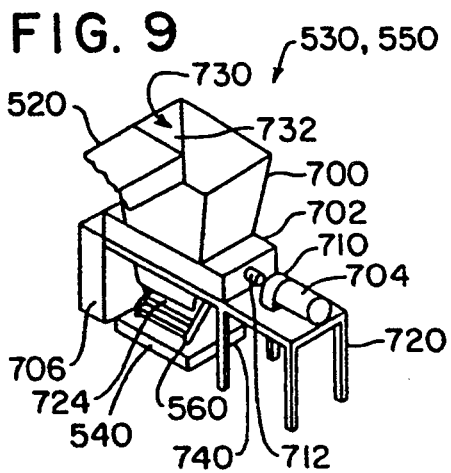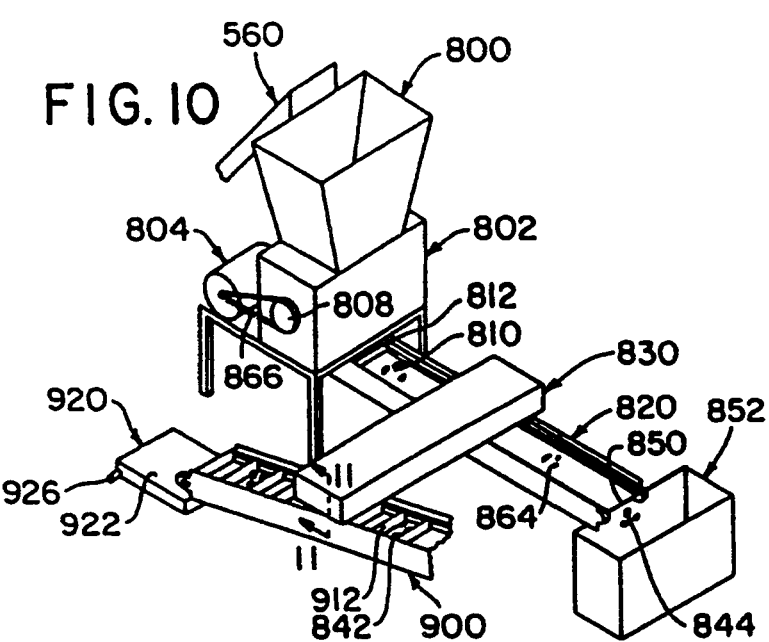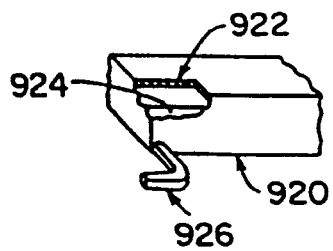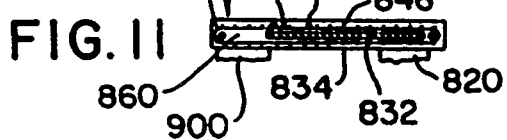

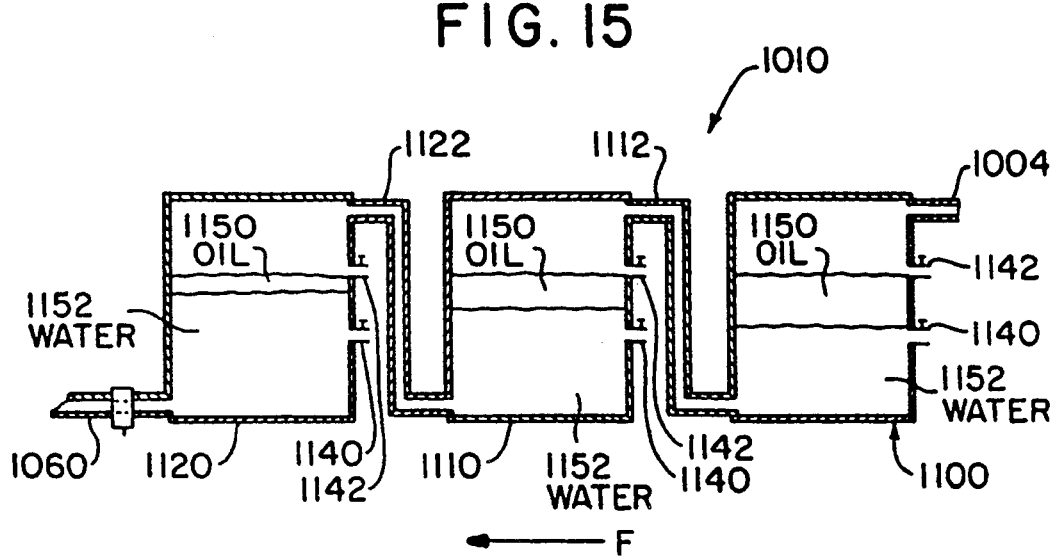
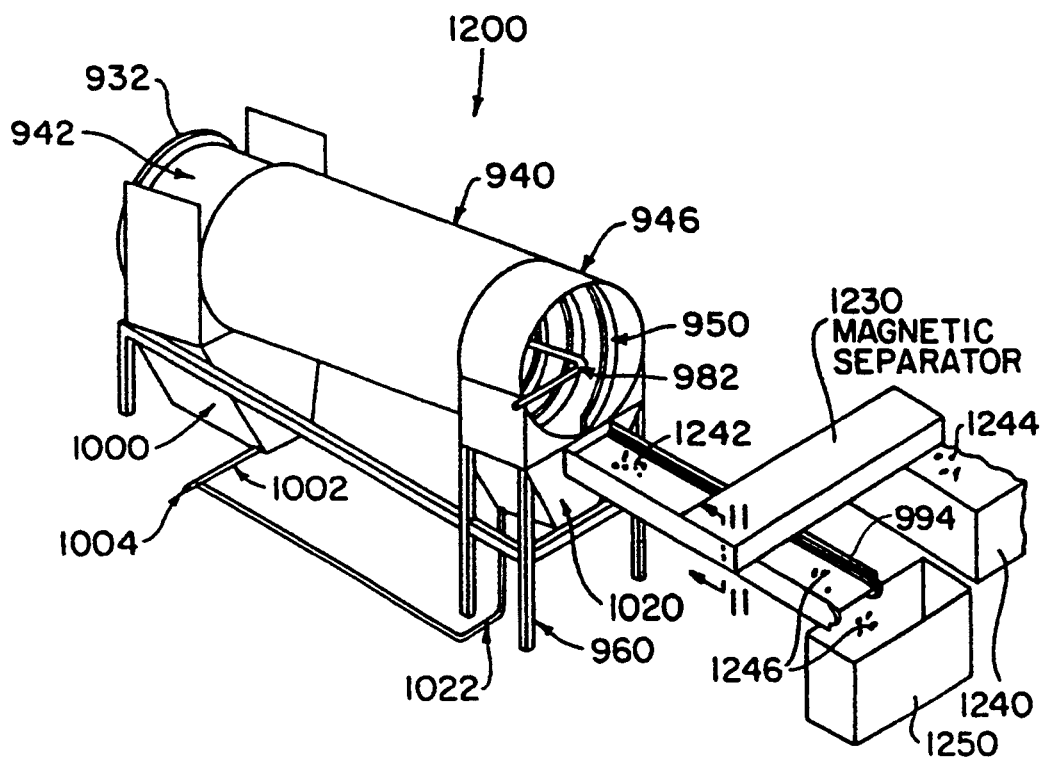

SYSTEM AND METHOD FOR RECYCLING OF AUTOMOTIVE OIL FILTERS

This is a continuation-in-part of copending application Ser. No. 7/838,188, filed on Feb. 18, 1992, now abandoned.

BACKGROUND OF THE INVENTION

1. Field Of Application

This invention relates to systems and methods that facilitate a safer environment; and more particularly, to systems and methods for recycling articles that have been subjected to their normal and intended use and which after such use are spent and contaminated and relatively dangerous to be merely disposed of in a dump or landfill.

2. Description Of The Prior Art

There is significant concern today for the environment and for the affect upon the environment of articles and materials that are disposed of after normal, intended and required usage. Everyday activities of society require that we eat, dress, live some place, work, travel to and from work, shopping, vacations and for other necessary and desired purposes, and engage in a myriad of other activities. Most of these activities require the use of materials and articles that must be properly disposed of after use or their useful life. Unfortunately, disposing of some of such articles and materials creates hazardous waste that could, if improperly disposed of, contaminate the land, water, air and other components of the environment. In addition, disposing of such articles and materials in landfills and other available facilities for solid waste disposal is rapidly filling up such facilities, and that has produced significant activity to recycle and otherwise separate from solid waste as much material as possible to reduce the bulk of the residue which is to be placed in such solid waste disposal facilities.

Various sets of equipment have been arranged in systems to function according to prescribed methods for the purpose of reducing the bulk of household and industrial waste and to recycle various components therefrom. One such system is shown and described in U.S. Pat. No. 4,815,668 granted on Mar. 28, 1989 to J. Frei for "Process And Device For Working Up Household, Industrial and Other Similar Waste." Other such systems are directed to removing specific components from household and industrial waste such as those shown and described: in U. S. Pat. No. 4,070,273 granted on Jan. 24, 1978 to B. W. Morey for "Glass Recovery" for removing glass from such waste; in U. S. Pat. No. 4,778,116 granted on Oct. 18, 1988 to J. L. Mayberry for "Municipal Waste Processing Apparatus" for separating grit, metal and glass from such waste; in U.S. Pat. No. 4,874,134 granted on Oct. 17, 1989 to T. J. Wiens for "Solid Waste Processing Facility And Process" for separating the biodegradable material from solid waste; in U.S. Pat. No. 5,067,659 granted on Nov. 26, 1991 to E. Heeren et al for "Method Of Treating Refuse Scrap" for removing metal content from such waste; and in U. S. Pat. No. 4,988,044 granted on Jan. 29, 1991 to D. H. Weitzman et al for "Steel Can Shredding/Delabeling System And Method" for separating steel and tin from such solid waste.

Still other systems and methods are directed to specific problems such as that shown and described: in U.S. States Pat. No. 3,476,570 granted on Nov. 4, 1969 to A. Moustafa for "Oleaginous Material Reclamation Process" for reclaiming margarine from packaging materials; in U.S. Pat. No. 5,056,541 granted on Oct. 15, 1991 to H. Schade et al for "Method And Apparatus For Removing Pollutants From Contaminated Soil"; in U.S. Pat. No. 4,139,454 granted on Feb. 13, 1979 to R. W. Larson for "Reclaiming System For Scrap Metals" for separating metals from automobiles; in U.S. Pat. No. 4,940,187 granted on Jul. 10, 1990 to T. Lee for "Systematic Equipments For Recycling Raw Materials From Waste Wires"; in U.S. Pat. No 5,074,477 granted on Dec. 24, 1991 to H. Welter et al for "Method Of Disposing Of Cooling Units" and in U.S. Pat. No. 4,851,123 granted on Jul. 25, 1989 to S. K. Mishra for "Separation Process For Treatment Of Oily Sludge."

However, none of the arrangements of equipment or methods or processes shown and/or described in the patents set out hereinabove are intended for or suitable for disposing of used or spent automotive oil filters in an environmentally safe manner. It must be kept in mind that there is a great amount of automotive traffic on the roads today and that the proper operation of automotive vehicles (trucks, cars, busses, etc.,) requires the use of oil filters disposed in the path traveled by oil that is pumped through their engines to keep the engines running. Such oil filters usually include a container of metal with a paper cartridge inside and through which the oil is passed to entrap contaminants that have been picked up by the oil. When the oil is changed in such vehicles it is quite usual to also change the oil filter. The used or spent oil filter is then disposed of; quite often with the other garbage. Even if allowed to drain for a reasonable time there is spent oil trapped within the oil filter, at times between 6 and 8 ounces of such oil per used filter. Dumping of such oily used oil filters on garbage dumps and in solid waste landfills has and will continue to create environmental problems. An environmentally safe disposition of used automotive oil filters is needed but not available with existing treatment and/or recycling arrangements and methods.

SUMMARY OF THE INVENTION

It is therefore an object of this invention to provide new and novel recycling arrangements.

It is another object of this invention to provide new and novel recycling methods.

It is still another object of this invention to provide new and novel arrangements of equipment for recycling used automotive oil filters.

It is yet another object of this invention to provide new and novel methods for recycling used automotive oil filters.

It is yet still another object of this invention to provide new and novel arrangements of equipment for separating the component parts of used automotive oil filters from each other for recycling purposes.

It is a further object of this invention to provide a new and novel methods or processes for separating the component parts of used automotive oil filters from each other for recycling purposes.

Other objects, features and advantages of the invention in its details of construction and arrangement of parts will be seen from the following description of the preferred embodiments when considered with the drawing and from the appended claims.

BRIEF DESCRIPTION OF THE DRAWING

In the drawing:

FIG. 9 is a schematic general arrangement, in perspective, of one of the shredders (from the primary or secondary position) of the equipment arrangement and process of FIGS. 6 and 7 and usable with that of FIGS. 1-5;

FIG. 10 is a schematic general arrangement, in perspective, of the hammer mill shredder and some associated equipment of the equipment arrangement and process of FIGS. 6 and 7;

FIG. 11 is a section through a magnetic separator utilized in FIG. 10 taken along line 11—11 therein;

FIG. 12 is a showing, in partial perspective, of a portion of a waste oil collector utilized in FIG. 10, cut away in part to better show details thereof;

FIG. 15 is a schematic showing of an arrangement of oil/water separation tanks utilized in the equipment arrangement and process of FIGS. 6 and 7 and utilized with that of FIGS. 1-5; and FIG. 16 is a schematic general arrangement, in perspective, of the cylinder washer of FIG. 13 in an alternative arrangement with some associated equipment.

DESCRIPTION OF THE PREFERRED EMBODIMENT

Figure 1:
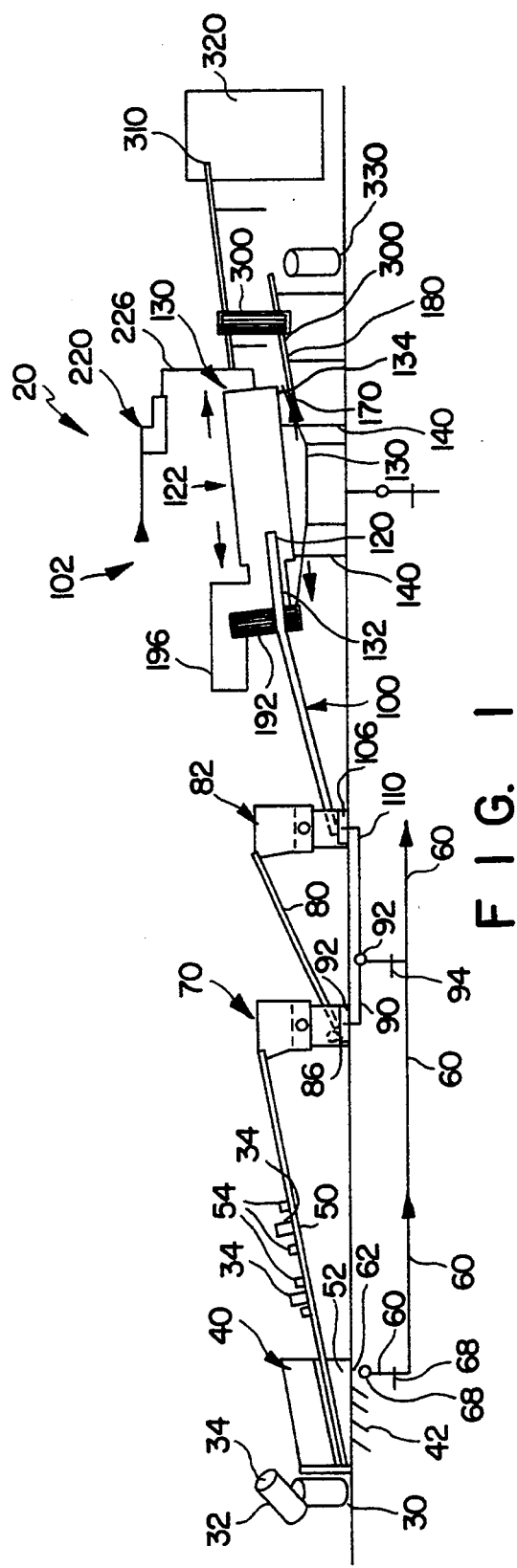
FIG. 1 a schematic flow diagram, in elevation, showing an arrangement of equipment and process, incorporating the instant invention, and undertaken to recycle used automotive oil filters.

With reference to FIG. 1, there is generally shown at 20 an arrangement of equipment and process for recycling of used automotive oil filters by separating and recovering the oil therefrom and by separating and recovering the paper of the filter portion of the oil filter and any metal from the container of the oil filter as well as any contaminants trapped within the filter.

A hydraulically operated tipper 30 of conventional construction is disposed to receive drums 32 of used automotive oil filters 34. Drums 32 are brought to and disposed for coaction with tipper 30 by suitable means such as a conveyor fork lift, hand-cart or even by hand. Tipper 30 in conventional manner raises each drum 32 to a predetermined height and then tips drum 32 to empty used oil filters 34 from drum 32 into a filter receiving and feed hopper 40 and then to return the empty drum 32 to the ground or floor level 42 where the empty drum 32 can be removed and replaced by a drum 32 that is full of used oil filters 34. At an appropriate time the full drum 32 will be lifted by tipper 30 and its oil filters 34 emptied into hopper 40.

Drums 32 may be of any conventional size but ones that hold approximately two hundred used automotive oil filters function well with arrangement 20. Hopper 40 is also of conventional construction with sides that taper downwardly and inwardly towards an opening (not shown) at the bottom of hopper 40 and through which used oil filters 34 fall or drop onto a conveyor belt 50. Hopper 40 may be of any conventional size but one that holds approximately 800 used oil filters function well with arrangement 20. Hopper 40 also includes a well or catch basin 52 at its bottom to receive spent oil that drips from used oil filters 34 in hopper 40 or that might have accumulated in drum 32 and have been spilled into hopper 40 when tipper 30 emptied filters 34 into hopper 40.

Conveyor belt 50 passes beneath the opening at the bottom of hopper 40 and receives used oil filters 34 therefrom. Drag components 54 such as flights of conventional construction are secured to and carried by conveyor belt 50 and spaced approximately six inches apart to receive between flights 54 a used oil filter 34. Other suitable spacings may be utilized. Conveyor belt 50 is of conventional construction and is formed from material that permits spent oil, dripping or seeping from filters 34, to drip or flow into well 52.

Figure 2:
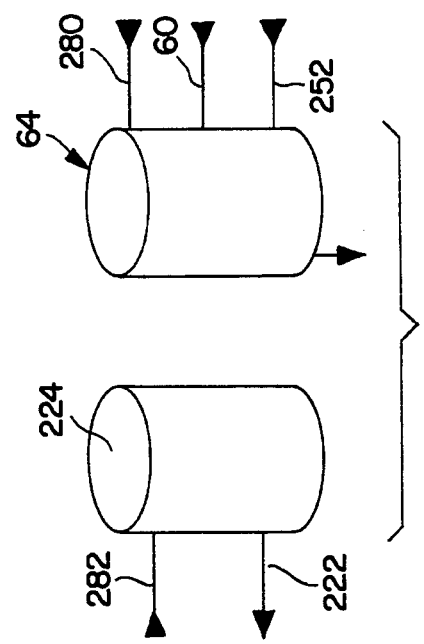
FIG. 2 is a schematic of the oil tanks utilized for the equipment arrangement and process of FIG. 1.

A suitable conduit 60 interconnects at 62 to the bottom of well 52 and receives oil collected therein to conduct such oil away to a waste oil storage tank 64 (FIG. 2). A filter 66 and pump 68, each of conventional construction, are provided in conduit 60 proximate end 62 thereof.

Conveyor 50 extends from beneath hopper 40 up to a primary shredder 70. The distance from the hopper end of conveyor 50 to primary shredder 70 is, in this instance selected to be twenty-six feet measured horizontally. Conveyor 50 is suitably and conventionally connected to power to run conveyor 50 and to controls for its operation, as is primary shredder 70. Primary shredder 70 is conventional in construction and operation but is, in this instance, provided with a 50 horsepower motor for its operation and with shredder blades aligned and configured to shred used automotive oil filters 34 to a first or coarse shred size. A suitable opening is provided at the bottom of primary shredder 70 to permit the shredded material to drop onto a drag conveyor 80 and to be carried thereby to a secondary shredder 82.

A well or tank 86 is provided beneath primary shredder 70 to receive spent oil from the used oil filters 34 that are being shredded by primary shredder 70 and to receive spent oil that may flow down drag conveyor 80 as shredded material is being transported by conveyor 80 to secondary shredder 82. A suitable and conventional conduit 90 extends from a suitable opening 92 provided in well 86 to conduct oil collected in well 86 to a filter 92 and therefrom through the action of a pump 94 to conduit 60 and waste oil storage tank 64 (FIG. 2). Pump 94 like pump 68 is suitably and electronically connected to a source of power and to conventional controls.

Drag conveyor 80 and secondary shredder 82 are also suitably and electrically connected to sources of power and into the controls for arrangement 20. The horizontal distance between primary shredder 70 and secondary shredder 82 is, in this instance, selected to be thirteen and one-half feet.

Secondary shredder 82 is of conventional construction and is in this instance one that is equipped with a 50 horsepower drive motor suitably and conventionally connected to a source of power and to controls for arrangement 20. The shredding blades for shredder 82 are different than the shredder blades for shredder 70 such that shredder 70 provides a rough or coarse cut while shredder 82 provides a finer cut. This will make it easier to separate the paper of the filter in used oil filter 34 from the metal of the filter itself.

Figure 3:
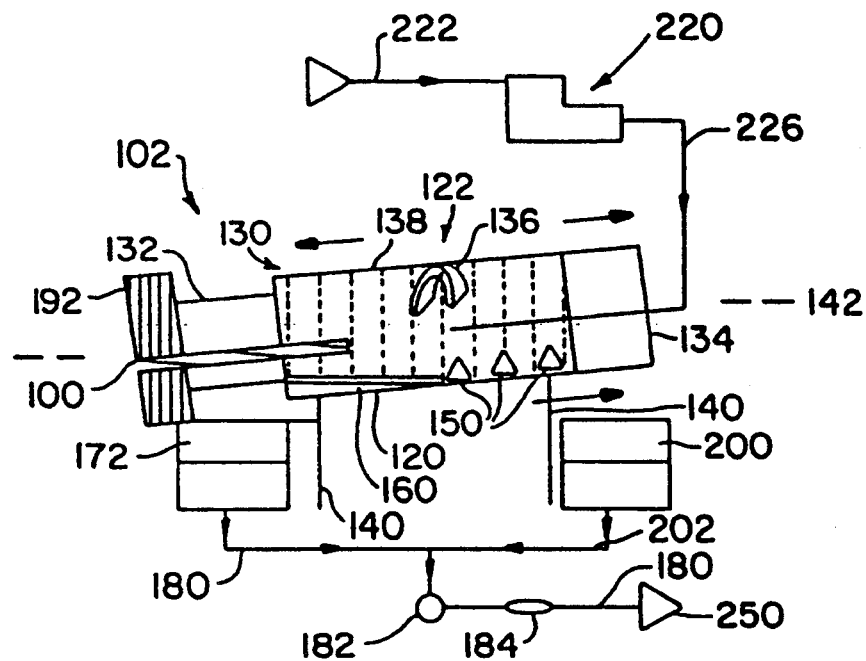
FIG. 3 is an enlarged detail of a portion of the equipment arrangement and process of FIG. 1.

The shredded material from secondary shredder 82 drops through a suitable opening provided at the base of shredder 82 and onto another drag conveyor 100 to be carried thereby approximately fifteen feet in this instance to a washing station 102 (FIGS. 1 and 3). A well 106 (FIG. 1) is provided beneath secondary shredder 82 to receive spent oil from the material being shredded by shredder 82 and to also receive oil from the shredded material that is being moved by drag conveyor 100. A suitable and conventional conduit 110 conducts the oil from well 106 to filter 92 and then through the action of pump 94 to conduit 60 and waste oil storage tank 64 (FIG. 2).

Drag conveyor 100, like drag conveyor 80 is conventional in construction and operation and is, in this instance, driven by a 2 horsepower motor suitably and conventionally connected to power and controls of arrangement 20. An other end 120 (FIGS. 1 and 3) of drag conveyor 100 extends into and terminates within a washing section 122 of washing station 102 such that shredded material being conveyed by conveyor 100 will drop off conveyor end 120 into washing section 122.

Washing section 122 is part of a washing and separating drum 130 that also includes at one end thereof a first screen section 132 and at a second end thereof a second screen section 134. A screw-like configuration forming an auger 136 (FIG. 3) is formed on an inner surface 138 of drum 130 extending from where screen section 132 meets washing section 122 to and through screen section 134. The screw-like configuration of auger 136 is, in this instance, in the form of a helical rib that extends up from surface 138 of drum 130 a predetermined amount and which spirals within washing section 122 (where it meets screen 132) up to the extreme end of screen 134. Washing section 122 is fabricated from solid material, such as metal or the like; while screen sections 132, 134 are fabricated from relatively thick metal screens with relatively small mesh openings sized and configured to pass oil and water therethrough but to not permit passage therethrough of paper or metal particles as will be hereinafter explained. Screen end section 132 is fabricated to a smaller diameter than washing section 122 and screen 134.

Drum 130 is mounted on support posts 140 and so as to rotate about an axis 142 (FIG. 3) that passes through the center of drum 130. Axis 142 is disposed at an angle to the horizontal so that screen portion 132 is lower (closest to floor 42) than screen portion 134. Suitable and conventional drive equipment, connected to the controls for arrangement 20, is provided to rotate drum 130.

A plurality of water spray nozzles 150 (FIG. 3) are provided within drum 130 to spray water, that is heated and under pressure, on the shredded material that is being moved along the inner surface of drum 130, by auger 136 through washing section 122. The heat and pressure of the thus sprayed water from nozzles 150 sprays the oil and paper off of the metal. The paper thus sprayed off the metal floats to the top of the oil and water in washing section 122 and by gravity back into screen end section 132. Whatever paper does not float back onto screen end section 132 will be advanced onto screen end section 134.

The angle at which drum 130 is mounted, to rotate about axis 142, and the diameter of screen end section 132 are respectively selected so that a float pool of water and oil 160, if there is any oil, collects extending from end of washing section 122 at screen 132 into washing section 122 and towards its end at screen 134. The paper and oil particles sprayed off of the metal particles by the heated and pressurized water from nozzles 150 float on the water and oil to the top of pool 160 and therefrom into screen end section 132. At the same time the so far cleaned metal particles are moved by auger 136 out through the open end of screen section 134 where the particles drop onto a picking belt 170 (FIG. 1). The configuration of auger 136 and its arrangement and disposition within drum 130 are such that when drum 130 is rotated in a selected direction the metal particles will be so moved through drum 130.

Figure 4:
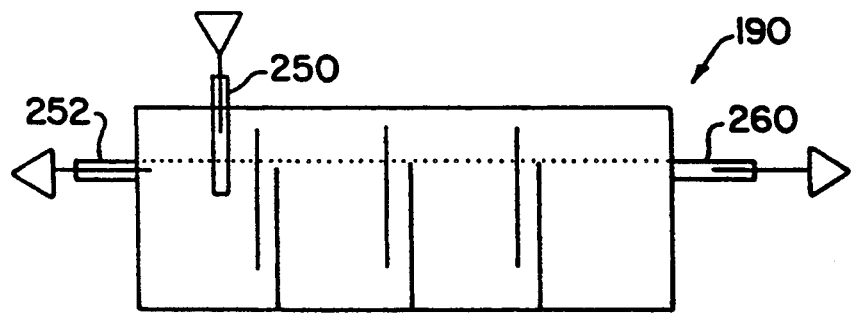
FIG. 4 is a schematic of the gravity oil and water separator of the equipment and system of FIG. 1.

As paper particles and oil separated from the metal particles float on pool 160 back into screen 132 the water and oil will pass through screen 132 and fall into a collecting tank or well 172 (FIG. 3) and therefrom through an appropriate opening leading from well 172 into a conduit 180. The flow of oil and water then continues through a filter 182 and by action of a pump 184 to an oil and water gravity separator 190 (FIG. 4).

Paper particles and pieces that have been floated into screen section 132 are lodged along the inner surface of screen section 132; rising up with said surface as screen section 132 rotates and then dropping off said surface of screen section 132 and moving downhill and dropping out the end 131 of the drum 130 and onto a take-away conveyor 192 (FIGS. 1 and 3) to be deposited in an appropriate collector like a drum or container 196. Conveyor 192 is of conventional construction and is suitably powered and connected into the controls for arrangement 20.

The metal particles do not float onto pool 160 but instead travel through screen section 134 and drop onto picking conveyor 170 (FIG. 1). Any paper particles still attached to the metal particles will also drop onto conveyor 170. Oil and water that happens to move with auger 136 and the metal particles moved thereby into screen section 134 will pass through screen section 134 and drop into a well or tank 200 and therefrom through an opening at the bottom of tank 200 into a conduit 202. Water and oil in conduit 202 will be drawn through filter 182, by the action of pump 184, and then be pumped into gravity oil and water separator 190 (FIG. 4).

The heated and pressurized water that is sprayed from nozzles 150 is provided to nozzles 150 from a water unit 220 (FIGS. 1 and 3). Water enters unit 220 through a conduit 222 that connects water unit 222 to a water storage tank 224 (FIG. 2). Suitable and conventional mechanisms in water unit 220 heat the water, in this instance to a temperature between 150 to 180 degrees Fahrenheit, and pressurize the water, in this instance, between 1800 and 3000 psi. The heated and pressurized water passes through a conduit 226 to spray nozzles 150. Suitable and appropriate controls, filters, and pumps are provided to control the flow of the water from storage tank 224 to water unit 220 and therefrom to nozzles 150.

Gravity oil and water separator 190 (FIG. 4) is of conventional construction and operation and is disposed to receive the oil and water that collects in tanks 172, 200 (FIG. 3) through a conventional conduit 250 (FIGS. 3 and 4) that connects separator 190 to pump 184. Oil that is skimmed from the oil and water in separator 190 passes through a conduit 252 that extends from separator 190 to waste oil storage tank 64 (FIG. 2). Suitable and appropriate filters, pumps, power and controls may be provided to facilitate the flow of such oil from separator 190 to tank 64.

Figure 5:
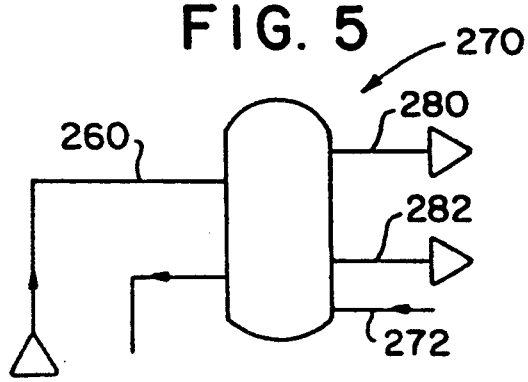
FIG. 5 is a schematic of a further oil and water separator for the equipment arrangement and process of FIG. 1.

Oily water from separator 190 passes from separator 190 through a suitable conduit 260 (FIGS. 3 and 5) to an oily water separator 270, in this instance one that is of the "Hotsy-type". Suitable and appropriate filters, pumps, power and controls may also be provided to facilitate the flow of the oily water from separator 190 to separator 270.

The "Hotsy-type" separator 270 is of conventional construction and is suitably and conventionally powered and controlled. A fresh water line 272 provides fresh water to separator 270. The action and operation of separator 270 separates the oil and water from the oily water. A conduit 280 conducts the so separated oil from separator 270 to oil storage tank 64 while a conduit 282 conducts the so separated water from separator 270 to water storage tank 224. If need be suitable filters, pumps, power and controls are provided to facilitate the flow of oil and water from separator 270 to the respective tanks 64 and 224.

Materials traveling on picking conveyor 170, which may include metal and possibly some paper and/or metal and paper, is subjected to a magnetic separator 300 of conventional construction and which is suitably and conventionally powered and controlled for arrangement 20. The metal particles and pieces are moved by magnetic separator 300 (FIG. 1) to a metal takeaway conveyor 310 and thereby to a suitable metal collector 320. Paper particles and anything else that remains on conveyor 180 is moved thereby and dropped off the end thereof into a suitable container such as a drum 330.

It should be noted that in arrangement 20 that the water used for nozzles 150 is recycled from water storage tank 224 and that gravity is used as a movement facilitator wherever possible to conserve energy usage.

Figure 6:
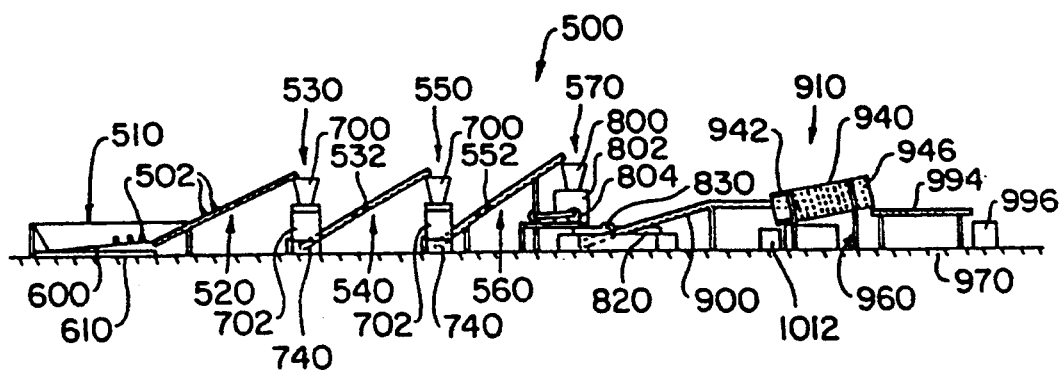
FIG. 6 is a schematic flow diagram, in elevation, showing an alternate and preferred arrangement of equipment and process, incorporating the instant invention, also to recycle used automotive oil filters.
Figure 7:
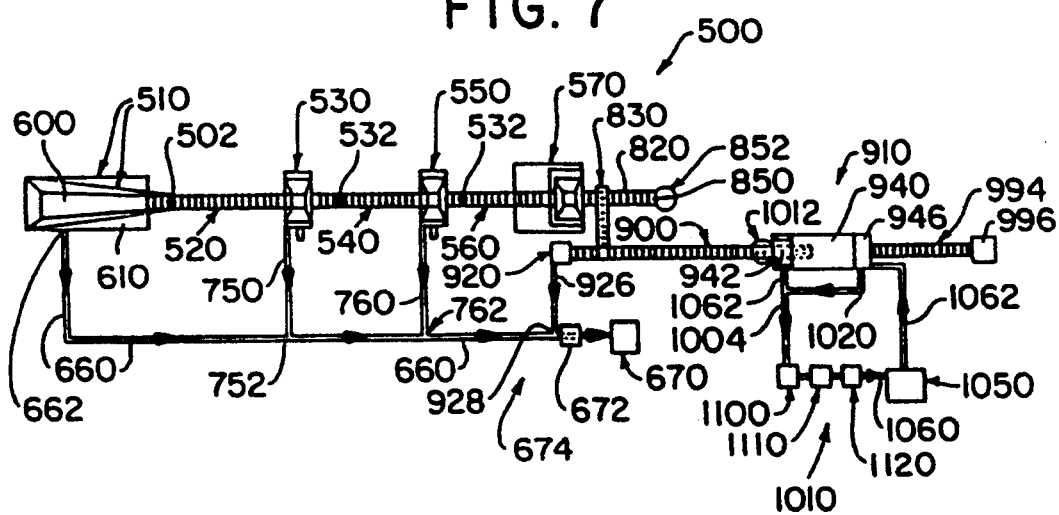
FIG. 7 is a schematic plan showing of the flow diagram of the arrangement of equipment and process of FIG. 6.
Figure 8:
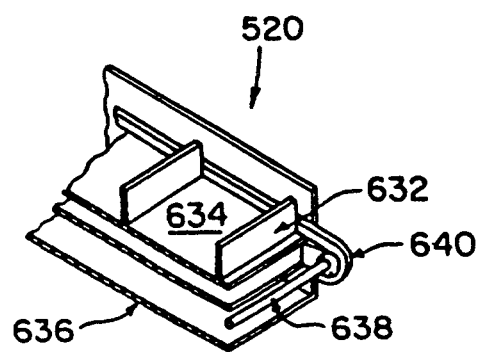
FIG. 8 is a perspective showing of a portion of at least one of the conveyors utilized in the equipment arrangement and process of FIGS. 6 and 7, and usable with that of FIGS. 1-5, sectioned in part to better show details thereof.

With reference to FIGS. 6 and 7 there is generally shown at 500 an alternative and preferred arrangement of equipment and process for recycling of used automotive oil filters by separating and recovering the paper of the filter portion of the oil filter and any metal from the container of the oil filter as well as any contaminants trapped within the filter.

Arrangement 500 includes a raw (used) oil filter tray or hopper 510 which supplies used oil filters 502 to a first inclined conveyor 520 that, in turn, conducts the used oil filters to a primary shredder station 530 for a first shredding operation. Shredded used oil filter material 532 exits primary shredder station 530 onto a second inclined conveyor 540 that, in turn, conducts shredded material 532 to a secondary shredder station 550 for a second shredding operation. Shredded used oil filter material 552 exits secondary shredder station 550 onto a third inclined conveyor 560 that, in turn, conducts shredder material 552 to a tertiary shredder station 570 for one further shredding operation.

Used oil filters 502 to be deposited into tray or hopper 510 may be initially collected in drums (not shown) that are turned over and emptied into tray 510 by a conventional drum tipper (not shown). Such a tipper, as described above for FIGS. 1–5 in conventional manner, would raise each such drum of used oil filters 502 to a predetermined height and then tip the drum to empty used oil filters 502 from the drum into the filter receiving and feed tray or hopper 510. The tipper would thereafter return the empty drum to the ground or floor level where the empty drum would be removed and replaced by another arrangement that is full of used oil filters 502. At an appropriate time the next full drum would be lifted by the tipper and its oil filters emptied into hopper 510. Other conventional means could be utilized to deposit used oil filters in tray or hopper 510.

Hopper or tray 510 is of conventional construction with sides that taper downwardly and inwardly towards an opening (not shown) at the bottom of hopper 510 and through which used oil filters 502 fall or drop onto an extension 600 of conveyor belt 520 which extends beneath hopper 510. Hopper 510 may be of any conventional size but one that holds approximately 800 used oil filters 502 functions well with arrangement 500. Hopper 510 is disposed over or includes a well, catch or basin or oil collection tray 610 that receives spent oil that drips from the used oil filters 502 in hopper 510 or that might have accumulated in the oil filter collection drum and have been spilled into hopper 510 when the used oil filters 502 were deposited into hopper 510.

Extension 500, of first inclined conveyor 520, moves used oil filters 502 from hopper 510 onto first inclined conveyor 520.

Each inclined conveyor 520, 540 and 560 is substantially identical in construction and operation. Accordingly, only inclined conveyor 520 will be described in detail. Drag components such as flights or collector fins 632, of conventional construction, are secured to and carried by a conveyor belt 634 at about six inch spacings and receive therebetween one or more used oil filters 502. Other suitable spacings may be utilized. Conveyor belt 634 is also of conventional construction and is formed from material that permits spent oil, dripping or seeping from used oil filters 502, to drip or flow into a well 636. A suitable source of motive power is connected through an axle 638 to a drive pulley 640 that is attached to and drives conveyor belt 634. Well 636 slopes towards oil collection tray 610 and conducts any oil that may have dripped through belt 634 into tray 636 into tray 610. Suitable and conventional electrical power and controls are provided for conveyors 520, 540 and 560.

A suitable fluid conduit 660 (FIG. 7) interconnected at 662 to the bottom of tray 610 receives oil collected therein and conducts such oil to a waste oil storage tank or container 670. An oil pump 672, of conventional construction, is provided in conduit 660 proximate an end 674 thereof. Suitable filters may also be provided in oil conduit 660.

Primary shredder station 530 and secondary shredder station 550 are substantially identical in construction, arrangement and operation. Accordingly, only station 530 will be described in detail. Each station 530, 550 includes a chute 700 (FIGS. 6 and 9) disposed to receive items (filters 502 from conveyor 520, shredded material 532 from conveyor 540) and directs such items to its shredder 702 to be shredded thereby. A motor 704 (FIG. 9), whose operation is controlled by a control 706, operates shredder 702 through a conventional and suitable gear box 710 and shaft 712. A support stand 720 mounts shredder 702, chute 700, motor 704, gear box 710 and control 706 for cooperative functioning.

The distance from the hopper end of conveyor 520 to chute 700 of primary shredding station 530 may be selected to be twenty-six feet, measured horizontally as was done for the FIG. 1–5 embodiment, but other suitable distances may be selected. The horizontal distance between primary shredder station 530 and secondary shredder station 550 may be selected to be thirteen and one-half feet but other suitable distances may be selected.

Suitable and conventional electrical power is provided for motors 704 and controls 706 (which are also of conventional construction). Motors 704 are selected to provide adequate power to shredders 702. In this instance motors 704 are of 50 horsepower each but other levels of power may be selected. Shredder 702 at primary shredder station 530 is provided with shredder blades and is configured and operated so as to shred used oil filters 502 to an output material 532 of a first or coarse shred size (say to 1½ inch by 6 inch slices); while shredder 702 of secondary shredder station 550 is provided with shredder blades and is configured and operated so as to shred material 532 to an output material 552 of an intermediate shred size (say ¾ inch by 3 inch slices).

Suitable openings 724 (FIG. 9) are provided at the bottom of shredders 702 to permit the shredded material (532, 552) to drop out of the shredders onto their respective conveyors (540, 560 respectively). Shredders 70 and 82 of the FIGS. 1–5 embodiment may also be constructed and configured as described above for shredders 702 at stations 530, 550.

Each shredder station may utilize a cover (not shown) of suitable material, such as 6 MIL plastic or the like, mounted over their respective chutes 700 but so that there is a space or opening 730 between the cover and an opening 732 leading into chute 700 and through which oil filters 502 (or shredded material 532) enter chutes 700 from their respective conveyors 520 (or 540 respectively). Such covers are disposed over chutes 700 to prevent material in chutes 700, and from shredders 702, from being thrown out of chutes 700 by action of shredders 702 and to redirect such material back into chutes 700 and shredders 702.

A well or oil collection tank 740 (FIGS. 6 and 9) is provided for each shredder station 530, 550, each disposed beneath openings 724 through which the shredded material exits the shredder 702 but at a distance spaced therefrom to permit the respective conveyor 520, 540 to pass between such opening 724 and the respective conveyor 520, 540. A fluid conduit 750 (FIG. 7) extends from the oil collector 740 at station 530 and connects to oil conduit 660 at 752; while a fluid conduit 760 extends from the oil collector 740 at station 550 and connects to oil conduit 660 at 762.

Shredded material 552 exiting station 550 is conducted by conveyor 560 to a chute 800 (FIGS. 6 and 10) and is directed thereby to a hammer mill shredder 802 of conventional construction. A motor 804, whose operation is controlled by a control (not shown) similar to control 706 of FIG. 9, operates hammer mill shredder 802 through a belt 806 (FIG. 10) and pulley 808. If desired a suitable and conventional gearing system or gear box may also be used or may be used directly between motor 804 and shredder 802 instead of belt 806 and pulley 808. Motor 804 is selected to provide suitable power to shredder 802 and, in this instance a 50 horsepower motor is selected. Shredder 802 is equipped, configured and operated to further reduce shredded material 552 to a final shredded material 810 of an approximate size of ¾ inch of an inch round. Suitable and appropriate electrical power is provided for motor 804 and/or its control.

A cover (not shown) of suitable material, such as ¼ inch steel plate, or the like, is mounted over chute 800 but so that there is a space or opening (not shown) leading into chute 800 and through which material 532 enters chute 800 from conveyor 560. The cover for chute 800 is disposed with respect to chute 800 and serves the same purposes as the covers for chutes 700 at stations 530, 550 as hereinabove described.

A spray or other flow of water is added at station 670 into chute 800 thereof to reduce heat generated by hammer mill 802 and to pre-clean paper being shredded.

Shredded material 810 drops from shredder 802 through an opening 812 and onto a side conveyor 820 (FIGS. 7 and 10) and is transported thereby passed a magnetic separator 830 (FIGS. 6, 7, 10 and 11) which, as will be hereinafter explained separates ferrous or magnetizable metallic material from the non-ferrous, non-magnetizable material such as the paper, etc., from the shredded used oil filters. Separator 830 includes a super magnet 832 (FIG. 11), either permanent or suitably powered, disposed in proximity to and between a lower run 834 and an upper run 836 of a magnetizable belt 840 to attract the ferrous, magnetizable materials 842 from material 810 and permit the non-ferrous, non-magnetizable material 844 to be transported by conveyor 820 to drop off an end 850 thereof into a collection bin 852. Fins or flights 846 may be provided for conveyor 840.

The ferrous particles of material 842 are attracted to the magnetized conveyor 840 and are carried thereby to section 860 thereof where conveyor 840 extends beyond and is not magnetized by super magnet 832. As such ferrous material 842 pass over an end 862 of conveyor 840 and onto a final inclined conveyor 900 to be transported thereby to a washing station 910 (FIGS. 6 and 7). An oil collector 920 is disposed at the foot of conveyor 900 to receive therefrom any remaining oil that may drip from material 842 as it is transported by conveyor 900 or as such material 842 drops from conveyor 840 of magnetic separator 830. Conveyor 900 is otherwise similar in construction and operation to conveyors 520, 540, 560 described above and conveyor 900 is similarly powered and controlled. A plurality of fins or flights 912 are provided for conveyor 900.

Oil collector 920 includes a filter cover 922 (FIGS. 10 and 12) disposed over a collector tray portion 924 (FIG. 12) with a fluid conduit pipe 926 extending therefrom into fluid conduit 660 (FIG. 7) at 928.

Figure 14:
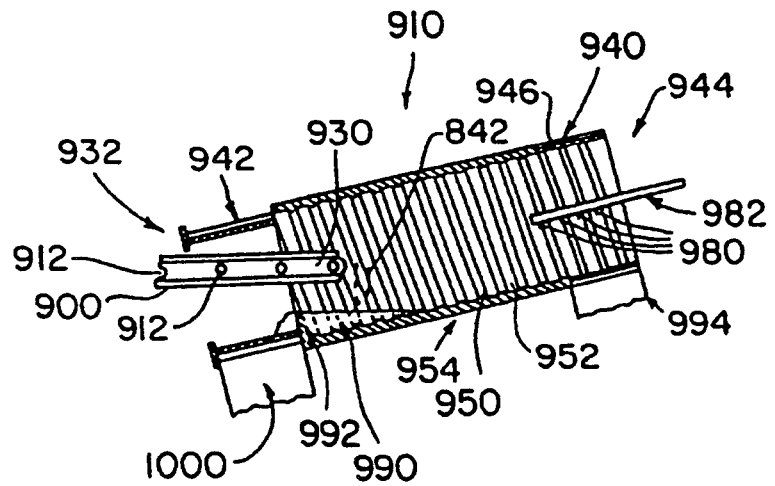
FIG. 14 is a vertical section through the cylinder washer of FIG. 13.

Material 842 deposited proximate the foot of conveyor 900 (FIGS. 6, 7, 13 and 14) is transported thereby until such material 842 drops off end 930 (FIG. 14) of conveyor 900 and into a receiving end 932 of a rotatably mounted washing cylinder 940.

Washing cylinder or drum 940 includes at receiving end 932 thereof a first screen section 942 and at an exit end 944 thereof a second screen section 946. A screwlike configuration of internal spiral fins 950 (FIGS. 13 and 14) form an auger-like arrangement on an inner surface 952 of drum 940 extending from screen section 942 to and through screen section 946. The screw-like configuration of auger 950 is, in this instance, in the form of a helical rib or fin that extends up from surface 952 of drum 940 a predetermined amount and which spirals within drum 940 up to the extreme end 944 of screen 946. Washing cylinder 940 includes a washing section 954 fabricated from solid material, such as metal or the like; while screen sections 942, 946 are fabricated from relatively thick metal screens with relatively small mesh openings sized and configured to pass oil and water therethrough but to not permit passage therethrough of metal particles as will be hereinafter explained. Screen end section 942 is fabricated to a smaller diameter than washing section 954 and screen 946.

Drum 940 is mounted on a support stand and roller assembly 960 (FIGS. 6 and 13) and so as to that facilitates rotation of drum 940 about an axis that passes through the center of drum 940. Said axis of rotation is disposed at an angle to the horizontal so that screen portion 942 is lower (closest to ground 970-FIG. 6) than screen portion 946. Suitable and conventional drive equipment, connected to the controls for arrangement 500, are provided to rotate drum 940.

A plurality of water spray nozzles 980 (FIG. 14) formed at the end of spray bar 982 are provided within drum 940 to spray water, that is heated and under pressure, on the shredded material 842 that is being moved along the inner surface of drum 940 by auger 950 through washing section 954. The heat and pressure of the thus sprayed water from nozzles 980 sprays the oil and any remaining paper off of the metal. Any paper thus sprayed off the metal floats to the top of the oil and water in washing section 954 and by gravity back into screen end section 942.

Figure 13:
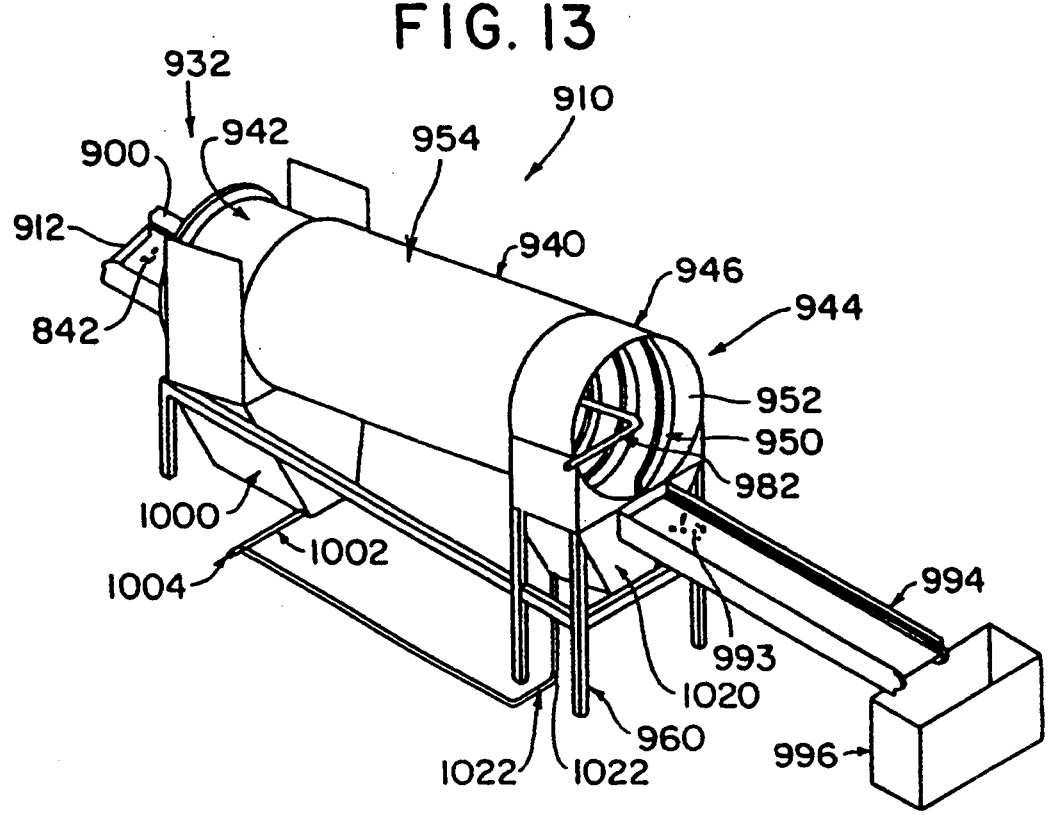
FIG. 13 is a schematic general arrangement, in perspective, of a cylinder washer and some associated equipment of the equipment arrangement and process of FIGS. 6 and 7 and usable with that of FIGS. 1-5.

The angle at which drum 940 is mounted, to rotate about its axis, and the diameter of screen end section 942 are respectively selected so that a float pool of water and oil 990, if there is any oil, collects extending from a water flow control dam 992 disposed proximate an end of washing section 954 at screen 942 into washing section 954. The oil particles sprayed off of the metal particles by the heated and pressurized water from nozzles 980 (and any remaining paper particles) float on the water and oil to the top of pool 990 and therefrom into screen end section 942. At the same time the so far cleaned metal particles 993 are moved by auger 950 out through the open end of 944 of screen section 946 where particles 993 drop into a conveyor belt 994 (FIGS. 6, 7, 13 and 14) and therefrom into a metal particle collector bin 996 (FIGS. 6, 7, and 13). The configuration of auger 950 and its arrangement and disposition within drum 940 are such that when drum 940 is rotated in a selected direction metal particles 993 will be so moved through drum 940.

As water and oil separated from metal particles 842 floats on pool 990 back into screen 942 the water and oil will pass through screen 942 and fall into a collecting tank 1000 (FIGS. 13 and 14) and therefrom through an appropriate opening leading from tank 1000 into a fluid conduit 1002. The flow of oil and water then continues through a pipeline 1004 (FIG. 13) to oil/water separator tank system 1010 (FIGS. 7 and 15). If desired suitable and conventional filters and a pump may be incorporated in pipes 1002 and 1004.

Paper particles and pieces that have been floated into screen section 942 are lodged along the inner surface of screen section 942; rising up with said surface as screen section 942 rotates and then dropping off said surface of screen section 942 and moving downhill and dropping out end 932 of drum 940 and into a fiber collector bin 1012. Oil and water that happens to move with auger 950 and the metal particles moved thereby into screen section 946 will pass through screen section 946 and drop into a tank 1020 and therefrom through an opening at the bottom of tank 1020 into a conduit 1022. Water and oil in conduit 1022 will flow therethrough and into fluid conduit 1004 to oil/water separator tank system 1010.

The heated and pressurized water that is sprayed from nozzles 980 is provided to nozzles 980 from a water heater/compressor unit 1050 (FIG. 6). Water enters unit 1050 through a conduit 1060 that connects water unit 1050 to oil/water separator tank system 1010. Suitable and conventional mechanisms in unit 1050 heat the water, in this instance to a temperature between 150 to 180 degrees Fahrenheit, and pressurize the water, in this instance, between 1800 and 3000 psi. The heated and pressurized water passes through a conduit 1062 to spray nozzles 980. Suitable and appropriate controls, filters, and pumps are provided to control the flow of the water from system 1010 to unit 1050 and therefrom to nozzles 980.

Oil/water separator system 1010 (FIGS. 6 and 15) is of conventional construction and operation and is disposed to receive the oil and water that collects in tanks 1000, 1020 (FIG. 13) through conduit 1004 that feeds a first tank 1100 of system 1010. Tank 1100 is connected to a second tank 1110 by a connector pipe 1112 (FIG. 15) and to a third tank 1120 by a connector pipe 1122. Fluid conduit 1060 extends from tank 1120 to unit 1050. If desired a suitable filter may be provided in conduit 1060. Each tank 1100, 1110, and 1120 includes a pair of oil skimmer valves 1140, 1142 through which oil 1150 that floats to the top of the water 1152 in tanks 1100, 1110, and 1120 may be skimmed off. Oil/water separation system 1010 otherwise operates in conventional manner with the flow of the oil/water mixtures therein proceeding in the direction of arrow F (FIG. 15). Suitable and appropriate filters, pumps, power and controls may be provided to facilitate operation of system 1010.

FIG. 16 shows an alternative arrangement of components for a washing station 1200 which is similar to station 910 described hereinabove with reference to FIGS. 6, 7, 13, 14 and 15 but which incorporates as a component part thereof a magnetic separator 1230 identical in construction, arrangement and operation to separator 830 described hereinabove with reference to FIGS. 10 and 11 as well as a collector bin or container 1240 disposed to receive ferrous metal particles from magnetic separator 1230. A washing cylinder or drum 940 identical in construction, arrangement and operation to drum 940 hereinabove described with reference to FIGS. 13 and 14 processes incoming shredded materials and deposits its output material 1242 onto conveyor 994 for movement below magnetic separator 1230 whereat ferrous materials 1244 are picked up by the conveyor belt in separator 1230 and transported to collector bin 1240. Non-ferrous materials 1246 continue on with conveyor belt 994 and are deposited in a collector bin 1250. Washing cylinder 940 washes materials traveling therethrough with heated water under pressure and otherwise functions as described hereinabove.

If desired, washing station 1200 may be substituted for station 910 thus adding a second magnetic separation facility or magnetic separator 830 may be eliminated from the FIGS. 6 and 7 arrangement with suitable conveyor arrangement to transport materials exiting shredding station 570 and for moving such materials to the washing station. Alternatively either a washing station arrangement such as 910 or 1200 may be utilized for the embodiment of FIGS. 1–5 in place of its washing station 102.

From the above description it will thus be seen that there has been provided novel and improved arrangements of equipment and processes for recycling materials; and more particularly, novel and improved arrangements of equipment and processes for recycling used automotive oil filters to reclaim oil, paper and metal therefrom.

It is understood that although there has been shown the preferred embodiments of the invention that various modifications may be made in the details thereof without departing from the spirit as comprehended by the following claims.

What is claimed is:

1. A recycling arrangement for used automotive oil filters; comprising:
    (a) shredding means for shredding used automotive oil filters into shredded pieces of predetermined size and configuration;
    (b) washing means for washing the shredded pieces, shredded by said shredding means, to separate oil, paper, and metal;
    (c) first conveyor means disposed for coaction with said shredding means and said washing means to convey shredded pieces from said shredding means to said washing means;
    (d) second conveyor means disposed for coaction with said washing means to receive therefrom and take away paper particles and pieces therefrom;
    (e) third conveyor means disposed for coaction with said washing means to receive therefrom and take away any remaining paper, metal particles and pieces therefrom; and
    (f) oil collection means disposed for coaction with said shredding means, said washing means and said first conveyor means to collect separated oil therefrom.

2. The recycling arrangement of claim 1, wherein said shredding means includes at least a first shredder and a second shredder each for shredding received materials to a different size.

3. The recycling arrangement of claim 2, wherein said first shredder shreds the materials it receives to a coarse size and said second shredder is disposed to receive the shredded materials from said first shredder and coacts therewith to shred same to a finer size.

4. The recycling arrangement of claim 3, including a shredder conveyor disposed to receive shredded materials from said first shredder and to convey same to said second shredder.

5. The recycling arrangement of claim 4, wherein said shredder means includes a third shredder for shredding materials received from said second shredder to an even finer size; and a second shredder conveyor is disposed to receive materials from said second shredder and transport such materials to said third shredder.

6. The recycling arrangement of claim 5, wherein said third shredder is a hammer mill shredder.

7. The recycling arrangement of claim 6, including watering means for providing water to at least said third shredder to cool the operation thereof.

8. The recycling means of claim 7, wherein cover means are provided for each said first, said second and said third shredder, each in a manner that permits deposit thereinto of materials to be shredded but coacts therewith to prevent such materials from being thrown out of said conveyor means.

9. The recycling arrangement of claim 8, wherein said cover means for said first and said second shredder are of 6 MIL plastic fabrication, and said cover means for said third shredder is a metal plate.

10. The recycling arrangement of claim 6, including magnetic separator means disposed for coaction with shredded materials exiting said third shredder to further separate ferrous and non-ferrous materials carried thereby.

11. The recycling arrangement of claim 10, wherein additional conveyor means are disposed to receive ferrous materials separated out by said magnetic separator means and to convey said ferrous materials to said washing means and collection means are disposed to receive non-ferrous materials not so separated out by said magnetic separator.

12. The recycling arrangement of claim 11, wherein said magnetic separator means includes at least an endless conveyor and a super magnet disposed to magnetize at least a portion of said endless conveyor to attract ferrous materials thereto.

13. The recycling arrangement of claim 1, including used oil filter receiving hopper means disposed to receive used automotive oil filters and input conveyor means disposed to receive such filters from said hopper means and to convey same to said shredding means.

14. The recycling arrangement of claim 13, including tipper means disposed to receive containers of used automotive oil filters and for coaction with said hopper means to deposit the oil filters from each such container into said hopper means.

15. The recycling arrangement of claim 14, wherein said oil collection means is also disposed for coaction with said hopper means and said input conveyor means to receive separated oil therefrom.

16. The recycling arrangement of claim 1, wherein said washing means includes a cylindrical drum disposed to rotate about an axis disposed at an angle to the horizontal so that a first end of said drum is disposed lower than a second end of said drum and wherein said drum includes auger means disposed within the drum to receive shredded pieces from said conveyor means and to conduct the shredded pieces from proximate said first end to and through said second end.

17. The recycling arrangement of claim 16, wherein a first screen portion is secured to and extends from said first end of said drum and a second screen portion is secured to and extends from said second end of said drum and heated and pressurized water is provided to an inside of said drum and is sprayed upon shredded pieces conveyed therethrough by said auger means to separate oil, paper and metal.

18. The recycling arrangement of claim 17, wherein said drum is disposed to have formed proximate said first screen portion a pool of water and oil upon which paper particles will float into said first screen section and therefrom out from said drum onto a paper take-away conveyor disposed proximate said first screen portion to receive the paper particles therefrom.

19. The recycling arrangement of claim 18, wherein said auger means moves separated metal particle and paper and metal particles through said second screen portion and onto a second take-away conveyor; and a magnetic separator is disposed for coaction with materials carried by said second take-away conveyor to further separate metal and paper carried thereby.

20. The recycling arrangement of claim 17, wherein water processing means are provided to heat and pressurize water and to provide said heated and pressurized water to said drum.

21. The recycling arrangement of claim 20, wherein fluid collection means are disposed for coaction with said drum means to receive water and oil that passes from said drum means to and through said first and said second screen portions.

22. The recycling arrangement of claim 21, wherein first oil and water separation means are disposed to receive oil and water from said fluid collection means and to coact with said oil and water so collected to effect skimming of oil therefrom and first conduit means extend from said first oil and water separation means to an oil collection tank to conduct skimmed oil thereto and second conduit means extend from said first oil and water separation means to a second oil and water separation means to conduct oily water thereto.

23. The recycling arrangement of claim 22, wherein said second oil and water separation means coacts with the oily water to separate same into oil and water and third conduit means conduct the separated oil from said second oil and water separation means to oil storage means and fourth conduit means conduct the separated water from said second oil and water separation means to a water storage means.

24. The recycling arrangement of claim 23, wherein said first oil and water separation means is a gravity type oil and water separator.

25. The recycling arrangement of claim 23, wherein said second oil and water separation means is a Hotsy-type oil and water separator.

26. The recycling arrangement of claim 25, wherein water from said first oil and water separation means and from said second oil and water separation means is conducted to the same water storage means and that water storage means provides water for said heated and pressurized water.

27. The recycling arrangement of claim 1, wherein cover means are provided over said shredding means in a manner that permits deposit thereinto of materials to be shredded but coacts therewith to prevent such materials from being thrown out of said conveyor means.

28. The recycling means of claim 27, wherein said cover means are 6 MIL plastic fabrications.

29. A recycling process for used automotive oil filters; comprising;
  (a) shredding the used automotive oil filters into shredded pieces of predetermined size and configuration;
  (b) providing washing means;
  (c) washing the shredded pieces, at said washing means, to separate oil, paper and metal;
  (d) providing first conveyor means for conveying the shredded pieces to be washed;
  (e) providing second conveyor means for conveying thereon paper particles and pieces away from said washing means;
  (f) providing third conveyor means for conveying thereon any remaining paper, metal particles and pieces away from said washing means; and
  (g) collecting oil from the shredded pieces and from said washing means, and said first, second and third conveyor means.

30. The recycling process of claim 29, wherein said shredding is accomplished by providing at least a first shredder and a second shredder each for shredding received materials to a different size.

31. The recycling process of claim 30, including shredding materials to at least a coarse size by said first shredder and to a finer size by said second shredded.

32. The recycling process of claim 31, including receiving shredded materials from said first shredder and conveying same to said second shredder.

33. The recycling process of claim 32 including shredded materials a third time to even a finer size.

34. The recycling process of claim 33, including shredding said material said third time in a hammer mill type shredder.

35. The recycling process of claim 34, including covering said materials while being shredded.

36. The recycling process of claim 35, including providing said coverings by using 6 MIL plastic.

37. The recycling process of claim 34, including providing water to cool when shredding material said third time.

38. The recycling process of claim 37, including subjecting material shredded said third time to magnetic separation to separate ferrous and non-ferrous materials.

39. The recycling process of claim 37, including transporting ferrous materials from said magnetic separation to a washing station and washing said materials with heated and pressurized water to separate oil therefrom.

40. The recycling process of claim 39, including collecting oil from and at each stage of said process.

* * * * *